3,849,534
COBALT STRIPPING
Roald R. Skarbo, Lexington, Mass., assignor to Kennecott Copper Corporation, New York, N.Y.
Filed July 19, 1973, Ser. No. 380,790
Int. Cl. B01d *15/06;* B01j *1/04;* C22b *23/04*
U.S. Cl. 423—139                                    8 Claims

ABSTRACT OF THE DISCLOSURE

Cobalt is removed from an oxime solution by contact with hydrochloric acid-sodium chloride solution for 30 minutes at 40–60° C. During contact the cobalt is released by the oxime to the acid solution where it remains as the organic and acid phases are allowed to separate.

CROSS REFERENCE TO RELATED APPLICATIONS

Related applications, Ser. Nos. 266,981, filed June 28, 1972, 266,985 filed June 28, 1972, 380,792 filed of even date herewith of Roald R. Skarbo, and 266,986 filed June 28, 1972, and 317,003 filed Dec. 20, 1972, of Roald R. Skarbo et al. describe recovery of copper and nickel by loading of an organic phase with metal values and the subsequent stripping procedure. This application describes a method to prevent cobalt poisoning of the organic phase by stripping cobalt metal from the organic phase. Cobalt stripping is also disclosed in copending application Ser. No. 380,793 of even date herewith by Roald R. Skarbo et al. All said applications are of common assignment with this application.

BACKGROUND OF THE INVENTION

The present invention relates to stripping of cobalt from liquid oxime metal extracting agents.

Oximes are currently used for the liquid-liquid extraction of copper and nickel from ammoniacal leach solutions containing all three metals and other metal values as well. The extraction is an ion exchange process wherein an exchangeable hydrogen ion of the oxime molecule is exchanged for the metal ion in the leach solution.

The use of organic oxime extractants in extraction and stripping metal recovery processes for recovery of copper and nickel from ammoniacal copper and nickel containing solutions normally results in coextraction of small amounts of cobalt also contained in such solutions. Final recovery of copper and/or nickel is accomplished by acid or alkaline stripping. Unlike copper and nickel, however, cobalt is not stripped readily from the organic. Consequently as the organic is recycled to extract additional copper and nickel in a continuous production process, the quantity of cobalt increases until the ability of the organic phase to extract the other metals is drastically reduced. This buildup of cobalt in the liquid organic is known as cobalt poisoning. The present invention provides a method of preventing this cobalt poisoning by stripping the cobalt before the extractant efficiency is reduced below acceptable levels.

It is therefore a principal object of the invention to prevent cobalt poisoning.

It is a further object of the invention to provide a process for stripping cobalt from organic nickel and/or copper extractants without substantially degrading the organic consistent with the preceding object.

It is a further object of the invention to provide a stripping process which is repeatedly usable over many cycles as part of a continuous recovery process consistent with one or more of the preceding objects.

It is a further object of the invention to provide ease of phase separation after mixing an organic phase with an aqueous stripping phase consistent with one or more of the preceding objects.

It is a further object of the invention to utilize economic stripping chemicals consistent with one or more of the preceding objects.

SUMMARY OF THE INVENTION

In accordance with the present invention the organic oxime is stripped of its cobalt values by contact with an aqueous solution comprising hydrochloric acid and sodium chloride in concentrations:

HCl: 2N–4N
NaCl: 50 g.–200 g./liter and at conditions of elevated temperature. The process of the invention affords advantages of improved phase separation, decreased loss of organic, decreased loading capacity loss, continued long term effectiveness of the organic extractant over many cycles of usage, and/or low reagent cost compared to one or more alternate methods of cobalt stripping.

These and other objects, features and advantages of the invention will be apparent from the following detailed description with reference therein to the accompanying drawing in which

DETAILED DESCRIPTION OF PREFERRED EMBODIMENTS

Figure 1:
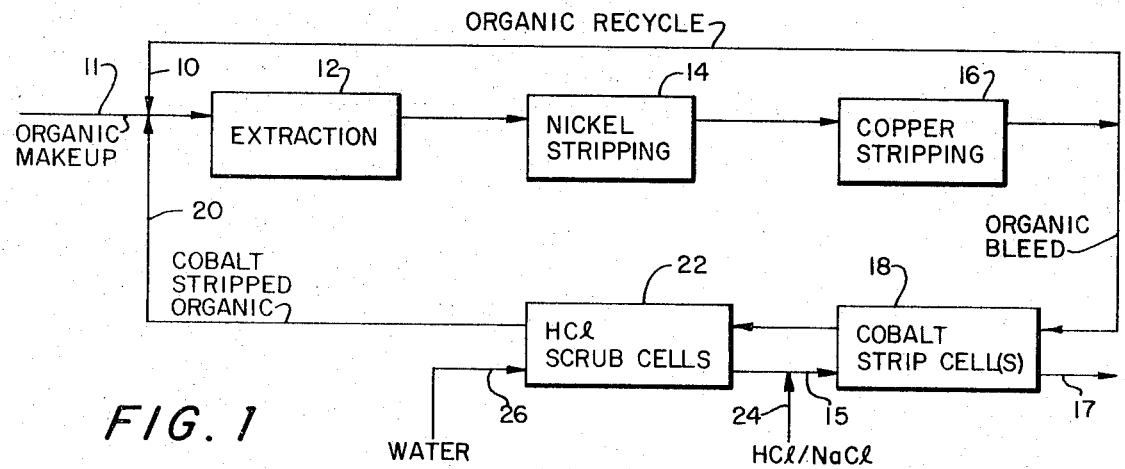
FIG. 1 is a schematic flow diagram of a cobalt strip cycle according to a preferred embodiment of the invention.

The oximes containing cobalt which can be stripped in accordance with the invention include $\alpha$-hydroxy oximes, substitued hydroxy benzophenoximes and mixtures thereof.

The $\alpha$-hydroxy oxime component has the general formula $$R-\underset{\underset{R''}{|}}{C}(OH)-\underset{}{C}(=NOH)-R'$$

Where R, R' and R'' may be any of a variety of organic hydrocarbon radicals such as aliphatic and alkylaryl radicals. R'' may also be hydrogen. Preferably, R and R' are unsaturated hydrocarbon or branched chain alkyl groups, containing from about 6 to 20 carbon atoms, R and R' are also preferably the same and, when alkyl, are perferably attached to the carbons substituted with the —OH and =NOH groups through a secondary carbon atom. It is also preferred that R'' is hydrogen or unsaturated hydrocarbon or branched chain alkyl groups containing from about 6 to 20 carbon atoms. The $\alpha$-hydroxy oximes also preferably contain a total of about 14 to 40 carbon atoms. Representative compounds are 19-hydroxyhexatriaconta-9, 27-dien-18-oxime, 5-10-diethyl-8-hydroxytetradecane-7-oxime, and 5,8-diethyl - 7 - hydroxydodecane-6-oxime. The latter compound has the following structural formula:

$$CH_3-(CH_2)_3-\underset{\underset{H}{|}}{C}(-CH_2-CH_3\text{ branch})-\underset{\underset{H}{|}}{C}(OH)-\underset{}{C}(=NOH)-\underset{\underset{CH_2-CH_3}{|}}{C}-(CH_2)_3-CH_3$$

Representative of other mono- and polyunsaturated radicals are heptenyl, octenyl, decenyl, octadecenyl, octadencynyl and alkyl substituted radicals such as ethylocatadecenyl. Representative of other mono- and polyalkyl substituted saturated radicals are ethylhexyl, diethylheptyl, butyldecyl, butylhexadecyl, ethylbutyldodecyl, butylcyclohexyl and the like.

The α-hydroxy oxime component is also characterized as having a solubility of at least 2% by weight in the hydrocarbon solvent used to make up the organic phase and substantially complete insolubility in water.

The substituted benzophenoximes strippable in the present invention have the following formula:

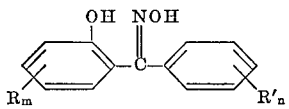

in which R and R' may be individually alike or different and are saturated aliphatic groups, ethylenically unsaturated aliphatic groups or saturated or ethylenically unsaturated aliphatic groups (i.e.—OR") and $m$ and $n$ are 0, 1, 2, 3 or 4 with the proviso that $m$ and $n$ are not both 0. The total number of carbon atoms in $R_m$ and $R'_n$ is from 3–25. R and R' contain 1 to 25 carbon atoms when saturated aliphatic and 3 to 25 carbon atoms when they are ethylenically unsaturated groups. Preferably, the position ortho to the phenolic OH substituted carbon atom is unsubstituted and also preferably the positions ortho to the oxime carbon atom on the other aromatic nucleus are unsubstituted. Branched chain saturated aliphatic hydrocarbon substituents are preferred. Compounds of the above type include the following:

2-hydroxy-3'methyl-5-ethylbenzophenoxime
2-hydroxy-5-(1,1-dimethylpropyl)-benzophenoxime
2-hydroxy-5-(1,1-dimethylethyl)-benzophenoxime
2-hydroxy-5-octylbenzophenoxime
2-hydroxy-5-nonyl-benzophenoxime
2-hydroxy-5-dodecyl-benzophenoxime
2-hydroxy-2',4'-dimethyl-5-octylbenzophenoxime
2-hydroxy-2',3",5"-trimethyl-5-octylbenzophenoxime
2-hydroxy-3,5-dinonylbenzophenoxime
2-hydroxy-4'-(1,1-dimethylethyl)-5-(2 - pentyl) - benzophenoxime
2-hydroxy-4'-(1,1-dimethylethyl)-5 - (2 - butyl) - benzophenoxime
2-hydroxy-4-dodecyloxybenzophenoxime
2-hydroxy-4'-(1,1 - dimethylethyl)-5-methyl - benzophenoxime
2-hydroxy-4',5-bis-(1,1-dimethylethyl) benzophenoxime When the α-hydroxy aliphatic oximes are present in combination with the 2-hydroxy benzophenoximes, the α-hydroxy aliphatic oxime extractants having the following general formula may be used:

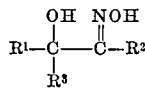

where $R^1$, $R^2$ and $R^3$ may be any of a variety of organic radicals such as aliphatic and alkylaryl radicals. $R^3$ may also be hydrogen. Preferably, $R^1$ and $R^2$ are unsaturated hydrocarbon or branched chain alkyl groups containing from about 6 to 20 carbon atoms. $R^1$ and $R^2$ are also preferably the same and when alkyl are preferably attached to the carbons substituted with the —OH and =NOH groups through a secondary carbon atom. It is also preferred that $R^3$ is hydrogen on unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9, 27-dien-18-oxime, 5,10-diethyl-8-hydroxytetradecan-7-oxime, and 5,8 - diethyl-7-hydroxydodecane-6-oxime. The latter compound has the following structural formula:

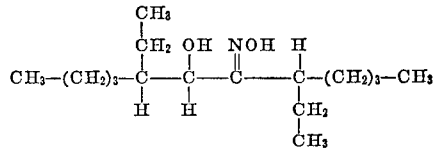

Representative of other mono- and polyunsaturated radicals are heptenyl, octenyl, decenyl, octadecenyl, octadecynyl and alkyl substituted radicals such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like. The $R^1$, $R^2$ and $R^3$ groups may contain inert substituents.

The relative amounts of the two extractants in the final oxime compositions may be varied widely without adversely affecting the strippability of cobalt therefrom. However, it is preferred to employ the α-hydroxy aliphatic oxime in the range of 1 to 100% by weight based on the weight of the 2-hydroxy benzophenoxime, with best results obtainable in the range of 15–50%. The amount of the extractants in the organic solvent likewise can vary within considerable limits. In general, however, the concentration of total oxime is in the range 2–40%, based on the weight of the organic extracting solution.

These and other suitable oximes are disclosed for example by U.S. Pats. 3,224,873, 3,592,775, 3,455,680, 3,428,449, 3,284,501, 3,655,347, 3,276,863 and 3,197,274.

Particularly suitable extractants comprise 2-hydroxy-4-nonyl-benzophenoxime which is the primary extractant in a composition also containing an α-hydroxy oxime sold by General Mills Inc. under the trade name LIX–64N; 5,8-diethyl-7-hydroxy-6-dodecanone oxime which is the primary extractant in a composition sold by General Mills Inc. under the trade name LIX–63 and 2-hydroxy-4-dodecyl-benzophenoxime which is the primary extractant in the composition also containing an α-hydroxy oxime sold by General Mills Inc. under the trade name LIX–64N; 5,8-LIX–65N; essentially 64N without any LIX–63,α-hydroxyoxime, in it.

FIG. 1 shows a process in which oximes are used in the extraction stage(s) 12 to remove copper and nickel from an ammoniacal leach solution, then pass through nickel stripping apparatus 14 and copper stripping apparatus 16. Some of the organic phase is bled off to a cobalt stripping apparatus 18 and the balance of the organic is recycled through line 10 to the extraction stage(s) 12. Fresh organic make up is introduced at 11.

Stripping mixture is introduced at 24 to enter the strip apparatus at 15 and emerge at 17 with transferred cobalt values. Strip pickup by the oxime is removed in apparatus 22 by treatment with water supplied at 26 and emergent at 15 to mix with fresh strip mixture supplied via 24. Typically there would be two scrub stages and one cobalt strip cell and the bleed would be 1/1000 of flow through circuit 10.

In cobalt strip apparatus 18, the organic is contacted with a solution of hydrochloric acid and sodium chloride. Preferably the HCl is 2.5 normal and the NaCl is present in the amount of 175 g./l. Equal volumes of organic and acid may be used although twice as much acid is preferred. The temperature may be in a range of 40°–70° C.

After contact for sufficient time to effect the ion exchange, the phases are allowed to separate with the cobalt remaining in the acid phase. The acid, NaCl and cobalt are removed from the strip cell at 17 after phase separation and the organic proceeds to a scrub cell 22 wherein any HCl is removed from the organic before it is recycled to the extraction cell 12.

Several properties of the strip solution determine the relative utility and practicality of the particular solution members. Important factors are strip efficiency, loading capacity loss, and organic loss. As used herein, strip efficiency is the percentage of cobalt removed by the acid from the loaded organic.

The loading capacity loss is defined as the decrease in ability of the recycled organic to extract copper in any extraction stage as compared with the ability of fresh organic to extract the copper. The calculation of loading capacity loss is made with the equation:

Capacity Loss (C.L.) = $[Cu]_{fo} - [Cu]_{so} - [Co]_{so}$
$$\times 63.54/58.93$$

Where
$[Cu]_{fo}$ = Cu loading capacity of fresh organic
$[Cu]_{so}$ = Cu loading capacity of stripped organic
$[Co]_{so}$ = Co content of stripped organic The last term adjusts the result to reflect the non-availability of some sites in the organic due to the presence of unstripped cobalt ions. The loading capacity loss is affected not only by the particular organic itself but also by the specific stripping solution.

The organic loss is also affected by the particular stripping solution. This loss is merely the volume decrease of fresh organic during a cycle and is expressed as:

$$\text{Organic Loss} = \frac{V_{fo} - V_{ro}}{V_{fo}}$$

Where $V_{fo}$ = volume of fresh organic
$V_{ro}$ = volume of recycled organic

The organic loss is sustained mainly as some of the organic is entrained in the acid phase after phase separation. Although the organic loss is quite low due to the poor solubility in HCl, it is still an important economic factor because of the large cost of organic as compared with the other materials in the process.

Figure 2:
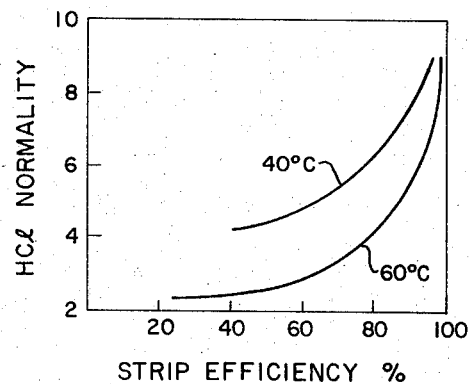
FIG. 2 is a concentration vs. efficiency graph showing the temperature dependence of strip process.

At slightly elevated temperatures an HCl solution alone may be used in the process to strip Co from the organic, but the normality must be very high. For example (see Table I) an 8.3N HCl solution would be necessary to strip 90% of the Co from the organic at 40° C. This efficiency can be compared with an operating temperature of 60° C. and a strip solution of 4.1N HCl. FIG. 2 and Table I show clearly that substantially higher acid concentrations are required to strip up to 95% Co at 40° C. than at 60° C.

TABLE I

[Stripping of Co from LIX-64N with HCl at different temperatures and acid concentrations (strip O/A ratio: 1; contact time: 30 min.)]

| HCl strip solution | | Temp., °C. | Co content of start organic (mg./l.) | Co content after strip. (mg./l.) | Strip efficiency (percent) | Loading capacity loss (percent) |
|---|---|---|---|---|---|---|
| G./l. | Normal | | | | | |
| 302 | 8.3 | 40 | 904 | 56 | 93.8 | 6 |
| 227 | 6.2 | 40 | 904 | 174 | 80.5 | 5 |
| 151 | 4.1 | 40 | 904 | 527 | 41.1 | <2 |
| 302 | 8.2 | 60 | 904 | 5 | 99.4 | 6 |
| 227 | 6.2 | 60 | 904 | 11 | 98.8 | 5 |
| 151 | 4.1 | 60 | 904 | 89 | 90.2 | 3 |
| 113 | 3.1 | 60 | 910 | 353 | 61.2 | <2 |
| 91 | 2.5 | 60 | 910 | 588 | 35.4 | <2 |

These HCl concentrations are very important not only in the cost of reagents but in the loading capacity losses suffered by the organic after each strip cycle. As indicated in Table I, the higher acid concentrations cause considerably higher loading capacity losses than the lower concentrations. In the previous example, 8.3N HCl and 4.1N HCl caused capacity losses of 6% and 3%, respectively.

TABLE II

[Stripping of cobalt from LIX-64N with HCl/NaCl solution at different temperatures and solution compositions (strip O/A ratio: 1; contact time: 30 min.)]

| Strip solution | | Temp., °C. | Co content of start organic (mg./l.) | Co content after stripping (mg./l.) | Strip efficiency (percent) |
|---|---|---|---|---|---|
| HCl norm. | NaCl (g./l.) | | | | |
| 6.2 | 25 | 40 | 904 | 128 | 85.8 [1] (80.5) |
| 4.1 | 75 | 40 | 904 | 436 | 51.8 (41.1) |
| 3.1 | 125 | 40 | 904 | 629 | 30.4 (—) |
| 6.2 | 25 | 60 | 888 | 11 | 98.8 (98.8) |
| 4.1 | 75 | 60 | 888 | 33 | 96.3 (90.2) |
| 3.1 | 125 | 60 | 888 | 80 | 91.0 (91.2) |
| 2.5 | 125 | 60 | 868 | 210 | 75.8 (35.4) |
| 2.5 | 175 | 60 | 910 | 99 | 89.1 (35.4) |
| 2.1 | 125 | 60 | 868 | 291 | 66.5 (26.6) |
| 2.1 | 175 | 60 | 910 | 175 | 80.8 (26.6) |
| 2.1 | 190 | 60 | 910 | 146 | 84.0 (26.6) |

[1] Number in parenthesis refers to strip efficiency with no addition of NaCl (see Table I).

Results in Tables I and II (graphically represented in FIGS. 2 and 3) represent an experimental attempt to optimize the HCl concentration (with NaCl present) with respect to strip efficiency on one hand and loading capacity loss on the other. At 60° C. the practical bounds on HCl concentration are 2.0N on the low side and 4.0N on the high side. Lower concentrations result in lower than 90% strip efficiencies while higher concentrations degrade the organic considerably and result in greater than 3% capacity losses.

Figure 3:
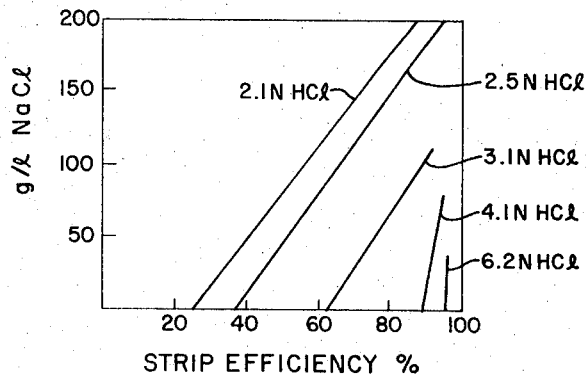
FIG. 3 is a concentration vs. efficiency graph showing the NaCl concentration dependence of the strip process.

The addition of NaCl does not appear to have any detrimental effects and as noted earlier the NaCl improves phase separation, decreases the cost of the solution and increases strip efficiency. FIG. 3 shows the steady increase in strip efficiency as the NaCl concentration increases. The amount of NaCl addition may only be limited by the solubility limit of the salt in HCl. The preferred embodiment of the strip solution consists of 2.5N HCl, the lowest concentration of HCl that is able to strip 90% of the cobalt from the organic, and 175 g./l. NaCl, which addition approaches the solubility limit of the HCl at the operating temperature.

TABLE III

[Results of cyclic Co-loading/stripping experiments using mixture of HCl (2:5N) and NaCl (175 g./l.) as strip solution (O/A ratio: 1; contact time: 30 min. temperature: 60° C.)]

| Expt. No. | Cycle number | Co content of start organic (mg./l.) | Co content after strip. (mg./l.) | Strip efficiency (percent) | Loading cap. loss (accum.) (percent) |
|---|---|---|---|---|---|
| 1 | 1 | 903 | 71 | 92.1 | <2 |
|   | 2 | 923 | 112 | 87.9 | <2 |
|   | 3 | 895 | 120 | 86.4 | <2 |
| 2 | 1 | 903 | 74 | 91.8 | <2 |
|   | 2 | 933 | 103 | 89.0 | 3.0±1.1 |
|   | 3 | 900 | 128 | 85.8 | 1.8±1.1 |

The duration of contact for example, from about 5 to 180 minutes, between the acid and the organic may have to be controlled to continually strip 90% of the cobalt from recycled organic. As shown in Table III the strip efficiency decreases in each succeeding cycle of the process if the contact time is held constant at 30 minutes. Based on the data in Table IV it was theorized that the decrease in strip efficiency may have been due to a decrease in the stripping rate on recycled organic rather than a build up of unstrippable cobalt in the organic.

TABLE IV

[Stripping of Co from 40 volume percent LIX-64N using various contact times (Strip solution: 2.5N HCl/175 g./l. NaCl; O/A ratio: 1; temp.: 60° C.)]

| Contact time (min.) | Co content after stripping (mg./l.) | Strip efficiency (percent) | Loading capacity loss (percent) |
|---|---|---|---|
| 30 | 71 | 92.1 | 0.8±1.1 |
| 60 | 21 | 97.7 | 4.7±1.1 |
| 120 | 7 | 99.2 |  |
| 180 | 4 | 99.6 | 5.5±1.1 |

Note.—Co content of start organic was 903 mg./l.

Again, as evidenced in Table IV, the cost of obtaining the high strip efficiencies is an increase in the loading capacity loss.

EXAMPLE 1

A volume of 100 ml. LIX-64N (General Mills trademark) containing 870 mg./l. Co was placed in a 500 ml. double walled beaker. An equal volume of strip solution containing 2.5N HCl and 175 g./l. NaCl was added and the entire mixture stirred for 30 minutes. The temperature of 60° C. was maintained throughout the mixing. After stripping the immiscible organic and aqueous phases separated and the aqueous phase (now containing the cobalt) was drawn off.

The stripped organic was scrubbed with water (organic/aqueous ratio of 2,2 minute contact time) until the scrub effluent reached a pH of 3.

Tests on the stripped organic indicated that 92.0% of the cobalt had been stripped. A comparison of the copper loading capacity of the fresh LIX-64N versus the stripped organic revealed capacity loss of less than 2%.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Process for removing cobalt from an oxime solution by acid stripping which comprises
    contacting the oxime solution with an aqueous solution of hydrochloric acid and sodium chloride,
    allowing the phases to separate, and
    recovering the oxime for reuse, and wherein the stripping solution comprises 2 Normal to 4 Normal HCl and 50 to 200 g./l. NaCl.

2. The process of claim 1 wherein the oxime mixture consists essentially of
    (a) a benzophenoxime of the formula

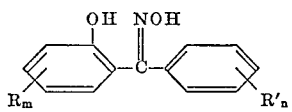

in which R and R' may be individually alike or different and are saturated aliphatic groups of 1–25 carbon atoms, ethylenically unsaturated aliphatic groups of 3–25 carbon atoms or —OR" where R" is a saturated or ethylenically unsaturated aliphatic group as defined, $m$ and $n$ are 0, 1, 2, 3 or 4 with the proviso that both are not 0 and the total number of carbon atoms in $R_m$ and $R'_n$ is from 3–25, and (b) an α-hydroxy aliphatic oxime of the formula

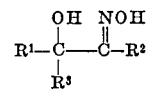

where $R^1$ and $R^2$ contain about 6 to 20 carbon atoms and are ethylenically unsaturated hydrocarbon or branched chain alkyl groups and $R^3$ is selected from the group consisting of hydrogen and ethylenically unsaturated hydrocarbon and branched chain alkyl groups of about 6 to 20 carbon atoms, said benzophenoxime (a) and α-hydroxy aliphatic oxime (b) being further characterized as being essentially insoluble in water and having a solubility of at least about 2% by weight in an essentially water immiscible organic solvent and said α-hydroxy aliphatic oxime (b) being present in the proportion of 1–100% based on the weight of the benzophenoxime (a).

3. The process of claim 1 wherein the oxime comprises 2-hydroxy-4-nonyl-benzophenoxime.

4. The process of claim 1 wherein the oxime comprises an α-hydroxy oxime of the formula

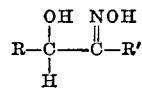

where R and R' are branched chain alkyl groups containing 6 to 20 carbon atoms attached to the carbons substituted with the —OH and =NOH groups through secondary carbon atoms, said oximes being further characterized as having a total carbon atom content of 14 to 40.

5. The process of claim 1 wherein the oxime comprises 5,8-diethyl-7-hydroxy-6-dodecone oxime.

6. The process of claim 1 wherein said aqueous and organic phases are mixed for 5–180 minutes at a temperature of 42°–70° C.

7. The process of claim 1 wherein
    the organic and acid are present in volume proportions of 1 to 2 parts orgainc to 1 part acid solution,
    said acid solution containing 2N to 3N HCl and 150 g./l. to 200 g./l. NaCl,
    and said organic and said acid solution remaining in contact for about 30–60 minutes at between about 50° C. and 60° C.

8. The process of claim 7 wherein the oxime to be stripped consists of 2-hydroxy-4-nonyl-benzophenoxime.

References Cited

UNITED STATES PATENTS

| | | | |
|---|---|---|---|
| 3,276,863 | 10/1966 | Drobnick et al. | 423—139 |
| 3,193,381 | 7/1965 | George et al. | 75—119 |
| 3,752,745 | 8/1973 | Kane et al. | 423—139 |

EARL C. THOMAS, Primary Examiner

B. E. HEARN, Assistant Examiner

U.S. Cl. X.R,
75—101 BE, 119